Sept. 12, 1967     W. J. SHERRIFF     3,340,622
TEACHING DEVICE
Filed May 18, 1965     2 Sheets-Sheet 1
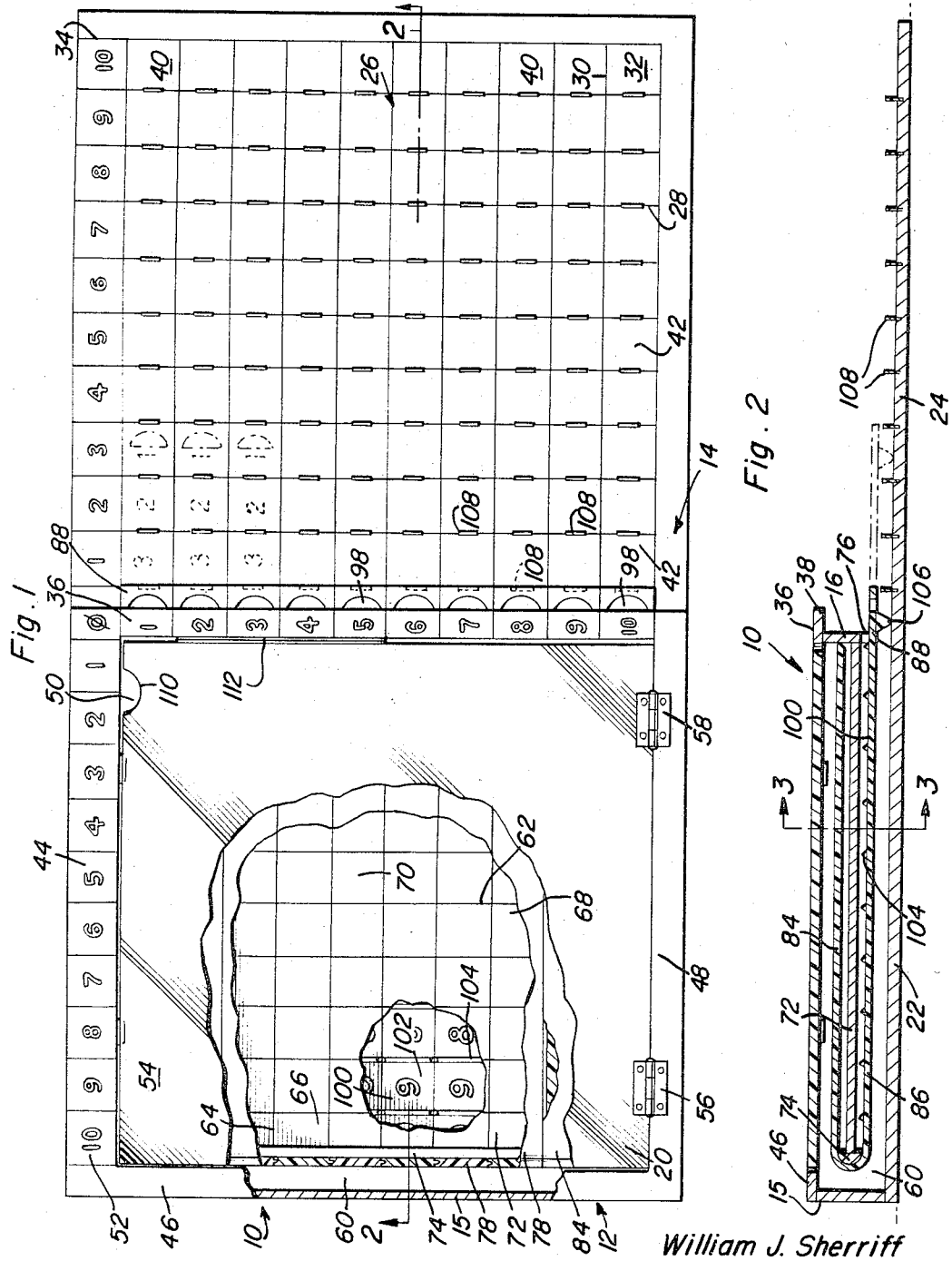
William J. Sherriff
INVENTOR.
BY Clarence A. O'Brien
and Harvey B. Jacobson
Attorneys

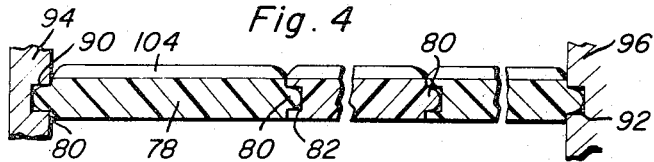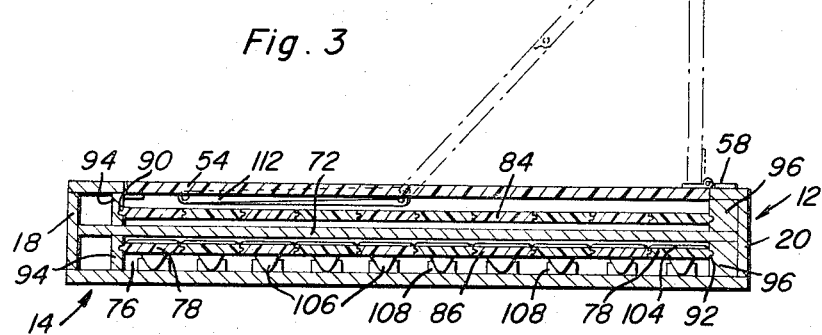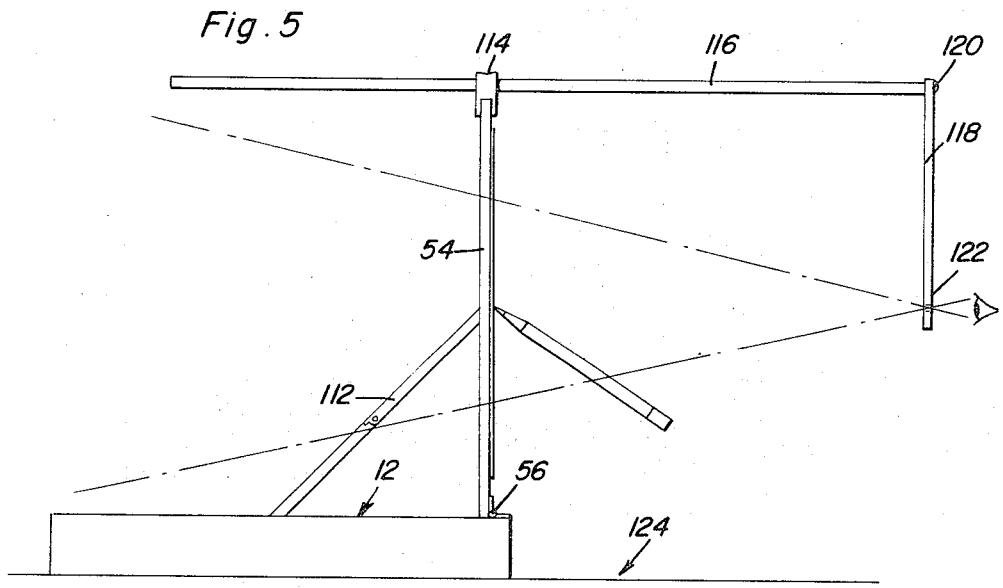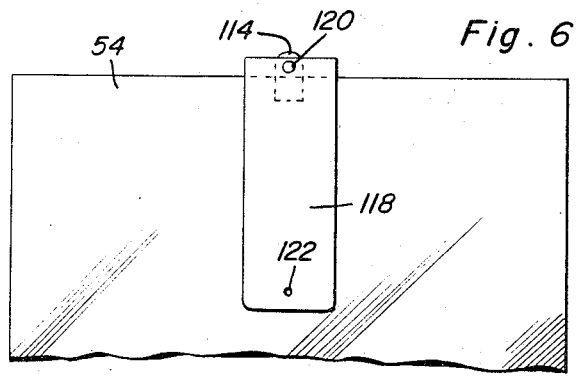

United States Patent Office 3,340,622
Patented Sept. 12, 1967

3,340,622
TEACHING DEVICE
William J. Sherriff, 533 S. Chicot Ave.,
West Islip, N.Y. 11795
Filed May 18, 1965, Ser. No. 456,688
8 Claims. (Cl. 35—31)

ABSTRACT OF THE DISCLOSURE

A teaching device in the form of a housing receiving a plurality of flexible slide members which may be individually drawn outwardly from or inserted into one edge of the housing. A supporting base is provided for the housing including a section which extends laterally therefrom over which the slide members are disposed when pulled from the housing. The slide member and the support section which underlies the slide members when extended have interengaging means to provide a sound to stimulate the sense of hearing while a background panel, the slide members and the support section include means for stimulating the sense of feel as well as the sense of sight. All of the components are constructed and arranged in such a manner to convey to students or others various concepts of numbers to facilitate understanding of such concepts.

---

This invention relates to a teaching device and more specifically to a device for instructing young children in concept of numbers and their manipulation.

The teaching of number relationships and arithmetical processes, as generally practiced today, attempts to indoctrinate inexperienced minds with the abstract idea of numbers, in disregard of the fact that the pupils have not yet experienced the concrete physical evidence of numbers upon which to relate the abstract ideas presented.

Therefore, it is a primary object of the present invention to provide a teaching device which illustrates graphically the actual physical evidence of numbers and the physical operations involved during computations using abstract numbers thereby simplifying the task of teaching the rudiments of numbers to young children.

In furtherance of the above object, it is still another object of this invention to provide an educational device which includes means to stimulate various of the senses such as touch, sight and hearing in order to relate the abstract idea of numbers to physical realities.

In accordance with the above objects, it is an object of the present invention to provide a teaching device which may be easily constructed from readily available materials and which is sturdy enough to withstand the rough handling of a child during continued use of the device thereby.

Another object of the present invention is to provide a teaching device together with attachments therefor which enable the device to be adapted for use as a drawing aid or window box.

It is still another object of the present invention to provide apparatus which may be used as a teaching device, a drawing aid or a game device, and which is simple enough for young children to grasp the technique of operation thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the teaching device comprising the present invention with sections broken away to illustrate the internal elements of the device;

FIGURE 2 is a vertical cross-sectional view taken substantially on the plane of the line 2—2 of FIGURE 1;

FIGURE 3 is a vertical sectional view taken substantially along the plane of the line 3—3 of FIGURE 2;

FIGURE 4 is an enlarged partial cross-sectional view illustrating the mounting structure of certain components of the teaching device;

FIGURE 5 is a side elevational view illustrating the teaching device of the present invention in use with certain attachments therefor; and FIGURE 6 is a partial elevational view of the alternative arrangement disclosed in FIGURE 5.

Referring now to the drawings, and particularly to FIGURE 1, the reference numeral 10 refers generally to the teaching device comprising the present invention. The teaching device 10 comprises a housing 12 mounted on a support member 14. The housing 12 includes a first side wall member 15, a second side wall member 16 substantially parallel to the first wall member 15, and third and fourth substantially parallel side wall members 18 and 20. The support member 14 as well as the wall members 15, 16, 18 and 20 are composed preferably of a substantially rigid material such as plywood, wood, or any well known substantially rigid plastic.

The support member 14 includes a first section 22 over which the housing 12 is conventionally mounted and a second section 24 which extends outwardly of the side wall member 16 of the housing 12. The first section 22 provides a bottom for the housing 12, and the second section 24 has a grid 26 on the upper face thereof. The grid 26 is composed of a series of parallel equally spaced lines 28 which cross at right angles another series of parallel equally spaced lines 30, thereby defining a plurality of squares 32 on the face of the support 14. As may be observed from FIGURE 1, there is a heading column 34 extending across the upper portion of the grid 26, the column 34 including the numerals 1–10 across the ten squares from left to right in the heading column. There is a central column 36 on the upper surface of a portion 38 of the housing 12 which overlies the side wall member 16. The central column 36 includes numerals 1–10 as a heading for each of the horizontal rows 40 of squares 32. Likewise, the heading column 34 provides heading for each of the vertical rows 42 of squares 32. Thus, it may be observed that the grid 26 is composed of 100 squares 32.

The housing 12 includes upper frame members 44, 46 and 48, which, along with the member 38 define an upper opening 50 in the housing. The frame member 44 includes a heading column 52 similar to the column 34, including numerals 1–10 thereon, running from right to left in FIGURE 1, the numerals being equally spaced along the column 52. All members on the columns 52, 34 and 36 are in raised relief to effect touch sense stimulation of the user. The housing 12 includes a cover member 54 mounted over the opening 50 by hinges 56 and 58, the cover 54 being movable from a closed portion as illustrated in FIGURES 1 and 3 to an open position as illustrated by the dotted lines in FIGURE 3. The cover member 54 is preferably of a transparent plastic material thereby allowing the user of the device to be able to see into the interior portion or chamber 60 of the housing 12.

Mounted within the chamber 60 defined by the housing 12 is a background board 72. This background board is conventionally mounted on the wall member 16 and extends transversely across the wall 16 between wall members 18 and 20 and extending within the chamber parallel to the bottom support member 14 and top member 54, stopping short of the wall member 15. The background board 72 has a plurality of grid lines 62 and 64 etched thereon, these lines corresponding to the grid lines 28 and 30 on the section 24 of the support member 14. The central column 36 and the heading column 52 respectively provide headings for the horizontal rows 66 and vertical rows 68 of squares 70 formed by grid lines 62 and 64. The background board 72 is colored so as to be readily visible through the top member 54, for a purpose to be discussed hereinafter. The background board 72 has a rounded slide guide 74 mounted on the end thereof adjacent the wall member 15. The wall 16 stops short of the support 14, thereby defining an elongated opening or slot 76 in the housing 12. Mounted within the housing chamber 60 and in sliding engagement with the slide guide 74, are ten slides 78.

Referring now to FIGURES 2–4, the mounting of the slides 78 in the chamber 60 may be readily observed. The slides 78 are preferably composed of a flexible plastic material or the like and each slide 78 except the slide adjacent the side wall 18 has a tongue edge portion 80 and a groove edge portion 82. With reference to FIGURE 4 it may be observed that the slide 78 adjacent the wall 18 has two tongue portions 80.

The slides 78 each comprise an elongated flexible member having an upper portion 84 which normally overlies the background board 72 and a bottom portion 86 which underlies the background board 72, the slides or elongated flexible members 78 normally being wholly retained in the chambers 60 except for a small portion 88 which extends out of the opening 76. The slides 78 are mounted for sliding engagement over the slide guides 74 by means of the tongues and grooves 80 and 82 and the grooves 90 and 92 in the mounting blocks 94 and 96 contained within the chamber 60. The end portion 88 of the bottom portion 86 of the slides 78 each have a finger hole 98 therein. By means of the finger holes 98 the slides 78 may be singularly withdrawn from the chamber 60, thereby exposing the background board 72 when the upper portion 84 of the slide 78 is moved, and also exposing the upper surface 100 of the bottom portion 86 of the slides 78 as it moves outwardly of slot 76. The upper surface 100 of each slide 78 is divided into squares 102 by the raised projections 104 positioned transversely across the surface 100 and equally spaced along the lower portions 86 of the slides 78. Thus, when the slides 78 are withdrawn, as shown by the dotted lines in FIGURES 1 and 2, a portion of the background board 72 will be visible through the transparent cover 54, thereby highlighting the squares 70 on the uncovered portion, while at the same time the squares 102 on the surface 100 of the slides are exposed to view. Each square 102 has a raised numeral thereon, the first square on the right having the numeral 1 thereon, the numerals running in increasing order to the left. It is apparent, therefore, that this device may be used to visualize the physical evidence of numbers by means of the squares 70 while at the saame time relating this physical evidence to the abstract numerals 1 through 10 on the squares 102. Further, the raised projections 104 enable the user to feel the length of the slide 78 which is withdrawn from the chamber 60, thereby enabling the user to count the number of squares uncovered.

Each slide 78 includes a depending projection 106 extending downwardly from the portion 88 into contact with the upper surface of the second section 24 of the support 14. The second section 24 of the support 14 includes flexible projections 108 mounted along the grid lines 28. Thus, when the user pulls out the slide 78 by inserting his finger in the opening 98, the tangs 106 will flex and release the projections 108 thereby causing the emission of sound vibrations.

It may be appreciated from the above description that various computations such as addition, subtraction, multiplication and division may be accomplished by withdrawing certain slides or a plurality of slides from the housing. The placement of numerals or characters in the columns 34, 36 and 52 enables the user to relate the numbers of squares uncovered to the abstract idea of "numbers." This device thereby provides amusement, entertainment and stimulation to the senses of touch, sight and hearing to the user. It will be appreciated, of course, that the slides 78 may not be withdrawn any further than the end of the section 24.

Referring now to FIGURES 5 and 6, the use of the teaching device 10 as a drawing board or window box is illustrated. The cover member 54 may be lifted from the opening 50 by means of the finger hole 110. Further, the cover member 54 may be retained in such open position by means of the hinge bracket 112, which bracket may be observed in both open and closed positions in FIGURE 3. The attachments for adapting the teaching device 10 for use as a window box are an adjustable clamp 114, a rod member 116, an aperture card 118, fastening means 120 and an aperture 122 in the aperture card 118. Thus it may be seen that the cover member 54 is opened and snapped in place by means of the hinge bracket 112, after which the housing 12 is positioned on a supporting surface such as a table 124 so that the opened top member 54 extends substantially vertical to the table. At this time the adjustable clamp 114 is clamped over the forward edge of cover member 54 and rod member is conventionally fastened therein. The aperture card 118 is connected to the observer's end or rod member 116 by means of a tack or other fastening device 120, the aperture 122 in the card 118 extending outwardly over the cover member 54. Thus, the user may view the object to be drawn through the aperture 122 and cover member 54, using substantially transparent paper on which to draw the object. The rod member is adjustable in clamp 114 to adjust the distance between card 118 and cover 54.

In view of the foregoing description it will be apparent that this device will permit the user to have full visualization of many mathematical principles, as well as combining movement, color, changing patterns, sound and touch to stimulate the various senses in the presentation of mathematical principles. It further provides a drawing aid to illustrate the principles of perspective, form, composition and projection. It may also be used in conjunction with a light source as a tracing aid. It may be appreciated that the use of this device is not limited to the basic arithmetical processes but also may be used to illustrate other abstract ideas of area, number series, percentages, fractions, squares, square roots, derivation of formulas, different number bases, and concepts of coordinates. Etched transparent overlay cards may be inserted under the clear plastic cover and lines may be drawn directly on cover member 54 and used in conjunction with the grid formed on background board 72 to indicate and emphasize the number concepts mentioned above. The overlay cards when used with the cover 54 and heading columns 36 and 52 adapt the device for use as a gameboard or decoding apparatus.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An educational device comprising a support having two sections, housing means mounted on the first section of said support, a transparent top member on said housing means, background means mounted in said housing, slidable slide means for said housing positioned over said background means, and means for selectively moving said slide means out of said housing whereby said background board will be selectively visible through said top member, the second section of said support including means for producing stimulation of the sight, touch and hearing senses during movement of the slide means in relation to the housing.

2. The structure as defined in claim 1 wherein said background means is in the form of a panel having grid lines thereon capable of stimulating the sight and touch senses and being distinguishably colored for enabling it to be readily visible through said top member, said background panel being disposed in said housing to define a passage around one edge of the panel for movement of the slide means in relation thereto.

3. The structure defined in claim 1 wherein said housing includes a frame means, said frame means having fixed reference characters thereon, said slide means comprising at least one elongated flexible member, said flexible member being foldingly disposed within said housing, and a portion of said flexible member extending outwardly of said housing.

4. Apparatus in accordance with claim 3 wherein said background means comprises a board having a slide guide at one end thereof, said flexible member being foldably disposed and slidable over said slide guide, said selective moving means providing a finger guide means in said extension portion and said housing including an opening therein whereby said flexible member is adapted to be partially withdrawn from said housing.

5. An educational device comprising a support having two sections, housing means mounted on the first section of said support, a transparent top member on said housing means, background means mounted in said housing, slidable slide means for said housing positioned over said background means, means for selectively moving said slide means out of said housing whereby said background board will be selectively visible through said top member, said housing including a frame means, said frame means having fixed reference characters thereon, said slide means comprising at least one elongated flexible member, said flexible member being foldingly disposed within said housing, a portion of said flexible member extending outwardly of said housing, said background means comprising a board having a slide guide at one end thereof, said flexible member being foldably disposed and slidable over said slide guide, said selective moving means providing a finger guide means in said extension portion and said housing including an opening therein whereby said flexible member is adapted to be partially withdrawn from said housing, the portion of said slide means adapted to be withdrawn from said opening including even spaced reference characters thereon, and said portion further having evenly spaced transverse projections from the upper surface thereof for separating said reference characters and providing stimulation for the sense of touch.

6. The structure defined in claim 5 wherein said second section is positioned adjacent said first section, flexible projections evenly spaced on said second section, a depending tang on said extension portion, said tang being adapted to contact said flexible projections upon withdrawal of said flexible member whereby said tangs will be flexed for emission of sound vibrations upon such contact.

7. Apparatus in accordance with claim 6 and including a plurality of said elongate flexible members disposed in said housing, said flexible members including means for interlocking sliding engagement therebetween, and means for interlocking sliding engagement between said flexible members and said housing whereby said flexible members may be singularly withdrawn from said housing.

8. Apparatus in accordance with claim 5 wherein said top member is hingedly mounted at one end on said housing, means for opening said top member, means for retaining said top member opened, clamp means adapted for mounting on the end of said top member opposite said one end, viewing means disposed in parallel relationship to said top member, and means for adjusting the distance between said viewing means and said top member, said top member adapted to be disposed substantially in line with a figure to be drawn for use as a window box.

References Cited
UNITED STATES PATENTS

| | | | |
|---|---|---|---|
| 544,642 | 8/1895 | Moore et al. | 35—26 |
| 561,797 | 6/1896 | Langworthy | 35—26 |
| 2,206,294 | 7/1940 | Stern | 35—31.5 |

EUGENE R. CAPOZIO, *Primary Examiner.*

W. GRIEB, *Assistant Examiner.*